W. P. Gannett,
Clothes Sprinkler.
Nº 55,008.   Patented May 22, 1866.
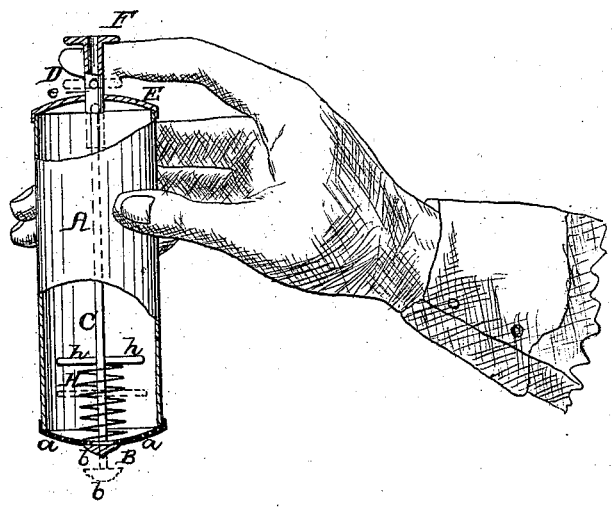
Witnesses:
Inventor;

UNITED STATES PATENT OFFICE.

WILLIAM P. GANNETT, OF BOSTON, MASSACHUSETTS, ASSIGNOR TO HIMSELF AND ISAAC GANNETT, OF CHICAGO, ILLINOIS.

IMPROVED CLOTHES-SPRINKLER.

Specification forming part of Letters Patent No. 55,008, dated May 22, 1866.

*To all whom it may concern:*

Be it known that I, WM. P. GANNETT, of Boston, in the county of Suffolk and State of Massachusetts, have invented a new and Improved Clothes-Sprinkler; and I do hereby declare that the following is a full, clear, and exact description thereof, which will enable others skilled in the art to make and use the same, reference being had to the accompanying drawing, forming part of this specification.

This invention relates to a novel hand device or implement to be used for the sprinkling of clothes previous to being ironed; and it consists in combining with a closed vessel or reservoir for the water employed, having one of its ends finely perforated, a valve so arranged at its perforated end with its stem extending up through the reservoir that by opening the valve the vessel can be filled with water, the air escaping through the upper or other end of the valve-stem, which is made hollow for that purpose, when, the valve being closed by means of a spiral or other spring suitably arranged therefor, the air duct or escape, as well as all entrance of the air to the reservoir, is then cut off, so that by then simply shaking the vessel with the hand the water will be thrown out of the same through its perforated end either in greater or lesser quantities, according to the force with which it is shaken, as will be apparent from the following detail description of the implement, reference being had to the accompanying plate of drawing, in which the figure is a central section through the implement, taken in the direction of its length.

A in the drawing represents the water reservoir or vessel, made of a cylindrical or other suitable shape, but of such a size as to be conveniently grasped by the hand, and of sheet-tin, brass, or other metal or material. This vessel is closed at both ends, but at one is perforated with a series of fine apertures, *a a*, of any desired number, with a large opening, B, in its center.

C is a stem or shaft extending entirely through the center of the vessel A in the direction of its length, with a valve or head, *b*, upon one end outside of the perforated head of the cylinder, of suitable size to entirely close the center opening, B, of the same when in contact with it, the other end, D, of the said stem projecting from the opposite or closed end, E, of the said reservoir, with a head or cap-piece, F, thereon. This end D of the stem is made hollow for a portion of its length, with an opening, *c*, in its side communicating therewith, the position of which opening *c* is such that when the valve-head of the stem is against the perforated end of the reservoir, closing its opening therein, the opening *c* of the valve-stem will be outside of the closed end of the vessel A, whereas if the center opening, B, is opened, by depressing the valve-stem, relieving its head therefrom, the said valve-stem opening *c* will be inside of the vessel A, thus establishing an escape through it and the hollow end or portion of the valve-stem for the air to pass from the interior of the vessel A as the water enters the same at its perforated end or head through its several perforations and center opening by immersing such end in a basin or other reservoir of water.

To the valve-stem cross-bars *h h* are fixed, between which and the perforated end of the vessel around the stem a spiral or coiled spring, H, is wound or placed, the purpose of which spring is to close and to hold the valve closed, while at the same time it will allow the valve to be opened by simply depressing the outer and upper end of the valve-stem with the thumb or finger of the hand.

When the device or implement above explained is to be used, it is first filled with water by dipping or immersing its perforated end in a basin or other reservoir of water, pressing or bearing down at the same time with the finger or thumb of the hand upon the open end of the valve-stem, care being taken not to cover its aperture at such end with the finger, thus opening the valve, through which the water flows into the vessel A of the implement, the air escaping through the open end of its valve-stem, which is then in communication with the interior of the vessel, when, the vessel having been sufficiently filled, the pressure upon the valve-stem is then removed, leaving the valve at the perforated end of the vessel free to close by the action of the spiral spring around its stem, which closing of the valve also shuts off the air-communication through the hollow end of the valve-stem, whereby the water is retained in the vessel, from which, by then simply shaking it with the hand, the water can be thrown out through its perforated head or sprinkled, according to the force with which it is so shaken, as is obvious without further explanation, the vessel A, after being so emptied of its contents, being filled again, as above explained, and so on as long as may be necessary or desired.

From the above description of my improved clothes-sprinkler it is plain to be seen that many important advantages are secured, among which may be here mentioned as the principal that my sprinkler to be used, after having been filled with water, requires to be only shaken, whereas in all other sprinklers it has been necessary to hold the finger over some air passage or tube or valve comunicating with the vessel to prevent the water from flowing too freely from the vessel, the disadvantages of which have long been manifest; that my sprinkler, while in use, can be laid down without the water escaping, which in all others could not be done, thus giving more freedom to the hands of the person using it; that it is exceedingly simple and cheap in construction and arrangement, while at the same time it is both practical and convenient, and can be placed in the market at such a price as to be within the means of all classes, the poor as well as the rich.

In lieu of making the end of the valve-stem open it may be closed and an aperture made in its side, but at such a point that when the side opening, $c$, is in communication with the interior of the vessel the other opening will be outside. By this arrangement all danger of stopping the escape of air through the valve-stem when the finger is upon its open end is obviated.

I claim as new and desire to secure by Letters Patent—

The clothes-sprinkler herein described, the same consisting of a water-reservoir provided with a valve, the air-passage through the stem of which is so made that the opening of the valve establishes a communication through the air-passage of the stem with the interior of the reservoir and the closing of the same shuts off or closes such communication, substantially as and for the purpose specified.

The above specification of my invention signed by me this 27th day of March, 1866.

W. P. GANNETT.

Witnesses:
ALBERT W. BROWN,
ALEX. F. ROBERTS.